United States Patent
Fotedar et al.

(10) Patent No.: US 8,243,594 B1
(45) Date of Patent: Aug. 14, 2012

(54) COORDINATED CONTROL OF MULTIPLE PARALLEL LINKS OR LINK AGGREGATIONS

(75) Inventors: Shivi Fotedar, Cupertino, CA (US); Sachin Bahadur, Santa Clara, CA (US)

(73) Assignee: Force10 Networks, Inc., San Jose, CA (US)

(*) Notice: Subject to any disclaimer, the term of this patent is extended or adjusted under 35 U.S.C. 154(b) by 227 days.

(21) Appl. No.: 12/315,617

(22) Filed: Dec. 4, 2008

Related U.S. Application Data

(60) Provisional application No. 61/007,008, filed on Dec. 10, 2007.

(51) Int. Cl.
*H04L 12/26* (2006.01)

(52) U.S. Cl. ............ 370/229; 370/230.1; 370/389; 370/242; 709/249; 709/224

(58) Field of Classification Search ............ 370/389, 370/254, 395.42, 468, 229, 230.1, 242, 248; 709/249, 224
See application file for complete search history.

(56) References Cited

U.S. PATENT DOCUMENTS

| | | | |
|---|---|---|---|
| 7,324,552 B1* | 1/2008 | Galand et al. ............ | 370/468 |
| 7,729,253 B1* | 6/2010 | Khambatkone et al. ...... | 370/235 |
| 7,787,370 B1* | 8/2010 | Aweya et al. ............ | 370/230 |
| 2002/0105949 A1* | 8/2002 | Shinomiya ............ | 370/386 |
| 2003/0179756 A1* | 9/2003 | Cain ............ | 370/395.42 |
| 2004/0028018 A1* | 2/2004 | Cain ............ | 370/338 |
| 2005/0276263 A1* | 12/2005 | Suetsugu et al. ............ | 370/389 |
| 2006/0165077 A1* | 7/2006 | Wybenga et al. ............ | 370/389 |
| 2007/0201380 A1* | 8/2007 | Ma et al. ............ | 370/254 |
| 2008/0080544 A1* | 4/2008 | Mani et al. ............ | 370/437 |
| 2008/0298236 A1* | 12/2008 | Ervin et al. ............ | 370/232 |
| 2008/0304519 A1* | 12/2008 | Koenen et al. ............ | 370/477 |
| 2009/0016383 A1* | 1/2009 | Suzuki et al. ............ | 370/509 |

* cited by examiner

*Primary Examiner* — Dang Ton
*Assistant Examiner* — Mandish Randhawa
(74) *Attorney, Agent, or Firm* — Haynes and Boone, LLP

(57) ABSTRACT

A packet switch contains a link state group manager that forms supergroups from multiple link aggregations. The link state group manager collects state information for the link aggregations in a supergroup, and uses state criteria to determine whether the link aggregations are allowed to be up, as a supergroup, for data traffic. This allows a supergroup of links to only come up when it meets a minimum performance criteria, with traffic routed around the supergroup when the supergroup cannot meet the minimum performance criteria, even if some link aggregations in the group are functional.

14 Claims, 8 Drawing Sheets

700

| LAG ID | LACP ID | LSGD GROUP ID | LAG STATUS | NUMBER OF LAG MEMBERS | GROUP STATUS |
|---|---|---|---|---|---|
| L1 | LACP1 | G1 | UP | 4 | UP |
| L2 | LACP2 | G1 | UP | 4 | UP |
| L5 | LACP5 | G2 | READY | 3 | DOWN |
| L6 | LACP6 | G2 | DOWN | 2 | DOWN |
| L4 | LACP4 | G3 | UP | 4 | UP |
| L3 | LACP3 | G3 | UP | 3 | UP |
| ⋮ | ⋮ | ⋮ | ⋮ | ⋮ | ⋮ |
| LN | LACP2 | 0 | DOWN | 2 | UP |

Fig. 3
(Prior Art)

| LACPDU STRUCTURE | OCTETS |
|---|---|
| DESTINATION ADDRESS | 6 |
| SOURCE ADDRESS | 6 |
| LENGTH/TYPE | 2 |
| SUBTYPE = LACP | 1 |
| VERSION NUMBER | 1 |
| TLV_TYPE = ACTOR INFORMATION | 1 |
| ACTOR_INFORMATION_LENGTH = 20 | 1 |
| ACTOR_SYSTEM_PRIORITY | 2 |
| ACTOR_SYSTEM | 6 |
| ACTOR_KEY | 2 |
| ACTOR_PORT_PRIORITY | 2 |
| ACTOR_PORT | 2 |
| ACTOR_STATE | 1 |
| RESERVED | 3 |
| TLV_TYPE = PARTNER INFORMATION | 1 |
| PARTNER_INFORMATION_LENGTH = 20 | 1 |
| PARTNER_SYSTEM_PRIORITY | 2 |
| PARTNER_SYSTEM | 6 |
| PARTNER_KEY | 2 |
| PARTNER_PORT_PRIORITY | 2 |
| PARTNER_PORT | 2 |
| PARTNER_STATE | 1 |
| RESERVED | 3 |
| TLV_TYPE = COLLECTOR INFORMATION | 1 |
| COLLECTOR_INFORMATION_LENGTH = 16 | 1 |
| COLLECTORMAXDELAY | 2 |
| RESERVED | 12 |
| TLV_TYPE = TERMINATOR | 1 |
| TERMINATOR_LENGTH = 0 | 1 |
| RESERVED | 50 |
| FCS | 4 |

300

| LAG ID | LACP ID | LSGD GROUP ID | LAG STATUS | NUMBER OF LAG MEMBERS | GROUP STATUS |
|---|---|---|---|---|---|
| L1 | LACP1 | G1 | UP | 4 | UP |
| L2 | LACP2 | G1 | UP | 4 | UP |
| L5 | LACP5 | G2 | READY | 3 | DOWN |
| L6 | LACP6 | G2 | DOWN | 2 | DOWN |
| L4 | LACP4 | G3 | UP | 4 | UP |
| L3 | LACP3 | G3 | UP | 3 | UP |
| ⋮ | ⋮ | ⋮ | ⋮ | ⋮ | ⋮ |
| LN | LACP2 | 0 | DOWN | 2 | UP |

COORDINATED CONTROL OF MULTIPLE PARALLEL LINKS OR LINK AGGREGATIONS

CROSS-REFERENCE TO RELATED APPLICATIONS

This application claims priority to co-owned, co-pending U.S. Provisional Patent Application Ser. No. 61/007,008, filed Dec. 10, 2007, by Shivi Fotedar and Sachin Bahadur, entitled COORDINATED CONTROL OF MULTIPLE PARALLEL LINKS OR LINK AGGREGATIONS, which is incorporated herein by reference in its entirety.

BACKGROUND

1. Field of the Invention

The present disclosure relates generally to link aggregation, and more particularly to systems and methods for coordinating the control of multiple link aggregations.

2. Description of Related Art

Link aggregation refers to a process for operating a group of physical links as if they were a single link. At least one standard for logical link aggregation has been promulgated by the Institute of Electrical and Electronic Engineers, e.g., in the IEEE 802.3-2005 standard, Clause 43 and Annexes 43A-C, incorporated herein by reference.

FIG. 1 illustrates one network configuration 100 amenable to a link aggregation approach. A first switch 110 comprises four physical layer transponders PHY1-PHY4 communicating respectively with four Media Access Control (MAC) link layer devices MAC1-MAC4. Each MAC communicates frame data with network processing 120. A second switch 130 comprises a similar configuration of four physical layer transponders PHY5-PHY8, four MAC link layer devices MAC5-MAC8, and network processing 140.

Switch 110 and switch 130 are connected by four full-duplex physical links. PHY1 and PHY5 communicate over a link LINK1,5. PHY2 and PHY6 communicate over a link LINK2,6. PHY3 and PHY7 communicate over a link LINK3,7. PHY4 and PHY8 communicate over a link LINK4,8. Each of these four links can be operated independently, which may be advantageous, for example, in a multiple spanning tree configuration. Alternately, if network processing 120 and network processing 140 possess hardware and/or software necessary to support link aggregation, they can negotiate the aggregation of two or more of the links connecting switches 110 and 130 to a common logical link that appears as a single, faster link.

Some basic link aggregation terminology and concepts from the IEEE 802.3-2005 standard are useful to the understanding of the embodiments. Referring to FIG. 2, several logical components of a packet network device 200 are shown, including a Media Access Control (MAC) client 210, a link aggregation sublayer 220, four individual MACs MAC1-MAC4, and four individual physical layer transponders (PHYs) PHY1-PHY4. The purpose of the link aggregation sublayer 220 is to combine a number of physical ports (represented by MACn/PHYn) logically for presentation to MAC client 210 as a single logical MAC. More or less than four physical ports are supportable by the framework, with up to the same number of MAC clients as physical ports supportable as well.

Link aggregation sublayer 220 is further subdivided into several logical components, including control parser/multiplexers (muxes) CPM1-CPM4, an aggregator 230, and aggregation control 260.

Each control parser/mux CPMn couples to a corresponding MAC MACn across an IEEE 802.3 MAC service interface. For egress frames (transmitted by one of the PHYs), each control parser/mux passes frame transmission requests from aggregator 230 and aggregation control 260 to the appropriate port. For ingress frames (received by one of the PHYs), each control parser/mux distinguishes Link Aggregation Control (LAC) Protocol Data Units (PDUs) from other frames, and passes the LACPDUs to aggregation control 260, with all other frames passing to aggregator 230. It is noted that although one aggregator 230 is shown, in the particular implementation shown in FIG. 2 there could be up to four aggregators—each control parser/mux CPMn passes its non-LACPDU ingress traffic to a particular aggregator bound to MACn, or discards the non-LACPDU traffic when MACn is not bound to an aggregator.

Aggregator 230 comprises a frame collection block 240, a frame distribution block 250, and up to four (in this embodiment) aggregator parser/muxes APM1-APM4. Aggregator 230 communicates with MAC client 210 across an IEEE 802.3 MAC service interface. Aggregator 230 also communicates with each control parser/mux CPMn that corresponds to a MAC MACn bound to aggregator 230.

Frame collection block 240 comprises a frame collector 242 and a marker responder 244. The frame collector 242 receives ordinary traffic frames from each bound MAC MACn and passes these frames to MAC client 210. Frame collector 242 is not constrained as to how it multiplexes frames from its bound ports, other than it is not allowed to reorder frames received on any one port. The marker responder 244 receives marker frames (as defined in IEEE 802.3-2005) from each bound port and responds with a return marker frame to the port that received the ingress marker frame.

Frame distribution block 250 comprises a frame distributor 252 and an optional marker generator/receiver 254. The frame distributor 252 receives ordinary traffic frames from MAC client 210, and employs a frame distribution algorithm to distribute the frames among the ports bound to the aggregator. Frame distributor 252 is not constrained as to how it distributes frames to its bound ports, other than that it is expected to supply frames from the same "conversation" to the same egress port. Marker generator/receiver 254 can be used, e.g., to aid in switching a conversation from one egress port to another egress port. Frame distribution 250 holds or discards any incoming frames for the conversation while marker generator/receiver 254 generates a marker frame on the port handling the conversation. When a return marker frame is received, all in-transit frames for the conversation have been received at the far end of the aggregated link, and frame distribution may switch the conversation to a new egress port.

Aggregator parser/muxes APM1-APM4, when bound to one of the physical ports, transfer frames with their corresponding control parser/mux CPM1-CPM4. On transmit, aggregator parser/muxes APM1-APM4 takes egress frames (ordinary traffic and marker frames) from frame distribution 250 and marker responder 244 and supply them to their respective bound ports. For ingress frames received from their bound port, each aggregator parser/mux distinguishes ordinary MAC traffic, marker request frames, and marker response frames, passing each to frame collector 242, marker responder 244, and marker generator/receiver 254, respectively.

Aggregation control 260 is responsible for configuration and control of link aggregation for its assigned physical ports. Aggregation control 260 comprises a link aggregation control protocol (LACP) handler 262 that is used for automatic communication of aggregation capabilities and status among systems, and a link aggregation controller 264 that allows automatic control of aggregation and coordination with other systems.

The frames exchanged between LACP 262 and its counterparts in peer systems each contain a LAC PDU (Protocol Data Unit), e.g., with a format 300 as shown in FIG. 3. The actor information and partner information contained in the LACPDU structure are used to establish and break link aggregations, with the "actor information" pertaining to the system sending the LACPDU, and the "partner information" indicating the state of the system receiving the LACPDU, as understood by the system sending the LACPDU.

The actor and partner information include a system ID, system priority, key, port ID, port priority, and state flags. The system ID is a globally unique identifier such as a MAC address assigned to the system. The system priority is a priority value assigned by the system administrator to the system. The key is a value assigned to the port by its system, and may be static or dynamic. The key is the same for each port on the system that is capable of aggregation with other ports transmitting that key. The port ID is a port number assigned by the system administrator to each port, and should be unique on the system. The port priority is a priority value assigned by the system administrator to the port, and should be unique among ports that are potentially aggregable. The state flags include LACP_Activity, LACP_Timeout, Aggregation, Synchronization, Collecting, Distributing, Defaulted, and Expired, and are defined as specified in IEEE 802.3-2005. In particular, the Synchronization bit is set TRUE when the link has been allocated to the correct Link Aggregation Group (LAG), the group has been associated with a compatible Aggregator, and the identity of the LAG is consistent with the System ID and Key transmitted by the port.

In operation, peered systems exchange LACPDUs to determine whether multiple ports that are aggregable to each other appear on both ends of the same link. To accomplish this, both endpoints calculate a Link Aggregation Group Identifier (LAG ID) for each participating port. The LAG ID combines actor and partner system priorities, system IDs, and keys. When the LAG IDs on two or more aggregable ports match, those ports are automatically assigned to the same LAG group, as long as both link endpoint systems make the aggregation.

BRIEF DESCRIPTION OF THE DRAWINGS

The present invention can be best understood by reading the specification with reference to the following Figures, in which:

FIG. 3 shows the field assignments for a IEEE 802.3 link aggregation protocol data unit;

DETAILED DESCRIPTION

Logical link aggregation, as explained above, is useful as a way to create a higher-bandwidth "pipe" between two systems. Another alternative is physical link aggregation, such as that described in the IEEE 802.3-2005 standard at clause 61, which in common implementations multiplexes packet data onto parallel lanes at the physical layer, and reassembles the packets at the receiver prior to passing the packets to the MAC layer. Both of these approaches have disadvantages of scale, due to maximum, as well as practical, limitations on the number of links in an aggregation. To physically aggregate multiple ports, the packet data has to be parsed and reassembled by essentially a single hardware device in communication with a single MAC, in essence placing a moderate practical limit on the number of links that can be physically aggregated. Likewise, the frame distribution and frame collection functions of a logical link aggregation are practically constrained to a single hardware device, with an appropriate high-rate interface to the MAC client. Accordingly, in a modular switch/router with multiple line cards, where all packets do not traverse a common processing point, it is generally only practical to aggregate ports on the same line card, or on only a section of the same line card that shares a common processing point.

In high-performance networks, more traffic may need to pass between two nodes than can be carried on a single link or even a single link aggregation. To this end, two or more equal-cost next-hop routes can exist and be advertised between two nodes, with the two or more routes corresponding to parallel links or parallel LAGs. Routing protocols such as OSPF (Open Shortest Path First) and IS-IS (Intermediate System-Intermediate System) allow two such routes to have equal cost. Equal-Cost MultiPath (ECMP) algorithms, such as those described in Internet Engineering Task Force (IETF) Request For Comments (RFC) 2991, "Multipath Issues in Unicast and Multicast Next-Hop Selection," 2000, incorporated herein by reference, attempt to balance traffic equally over multiple equal-cost next-hops by approaches such as hashing of partial packet header contents. When successful, such an approach increases the bandwidth available between two nodes beyond the bandwidth available on a single link or single LAG.

Figure 4:
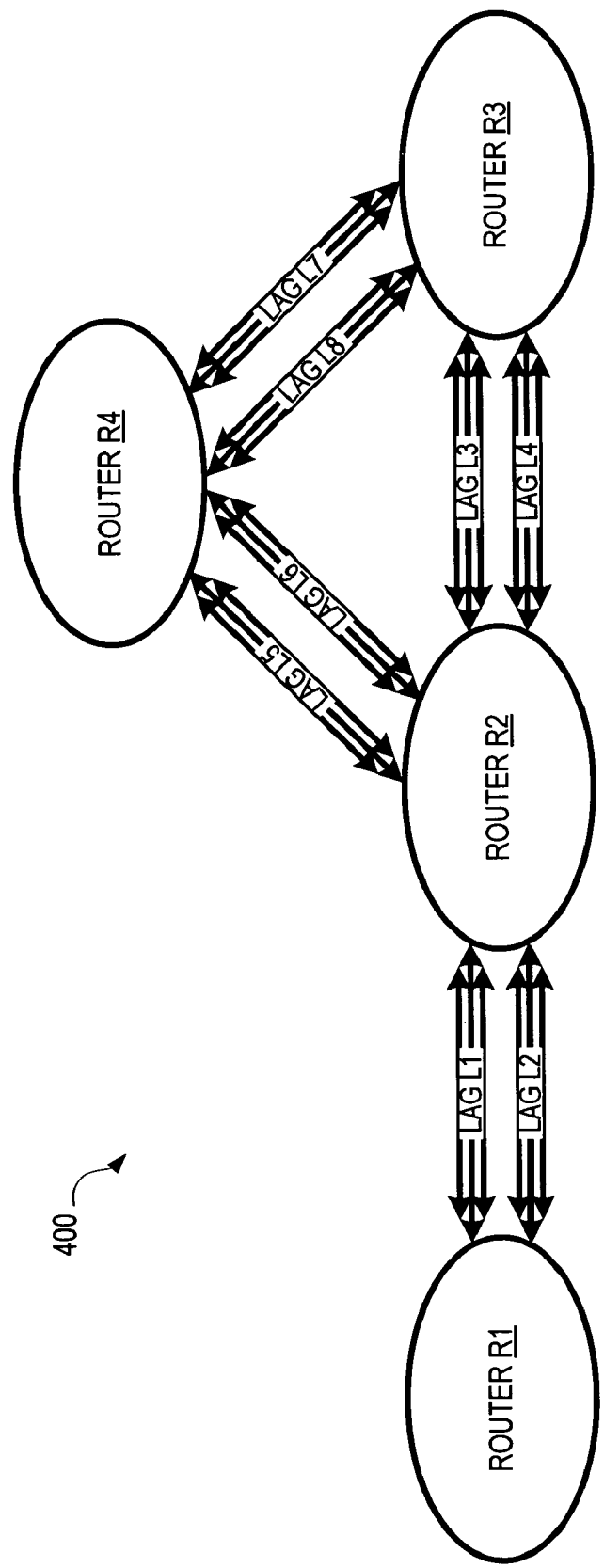
FIG. 4 illustrates a partial network configuration comprising four routers connected by multiple LAGs.

In FIG. 4 a portion of a network 400, comprising four routers R1, R2, R3, and R4, is shown. Routers R1 and R2 are connected by two Link Aggregation Groups (LAGs) L1 and L2; routers R2 and R3 are connected by two LAGs L3 and L4; routers R2 and R4 are connected by two LAGs L5 and L6; and routers R3 and R4 are connected by two LAGs L7 and L8. Assuming all LAGs have the same line rate lr and equal path cost C, the least-cost path from R1 to R4 is R1-R2-R4, using either L1 or L2 and either L5 or L6. With R1 and R2 using ECMP, router R1 load shares between L1 and L2 on its traffic to R2, and R2 load shares between L5 and L6 to deliver traffic from R1 to R4.

It is recognized herein that under certain conditions, it may be undesirable to maintain any of several parallel ECMP routes between two nodes. For instance, consider a case where R1 has traffic to deliver to R4 at a rate r, where $1.8lr < r \leq 2lr$. When all LAG groups are operating normally, this traffic is carried without problem between R1 and R2 on LAGs L1 and L2, and without problem between R2 and R3 on LAGs L5 and L6. Suppose, however, that one or more links in LAG L6 were to go down, leaving L6 capable of sustaining a maximum rate less than 0.9lr. Since R2 is attempting to distribute more than 0.9lr on LAG L6 (assuming an equal distribution algorithm), some traffic inevitably will be dropped. Many traffic sources exhibit undesirable behavior when dropped traffic is significant, and some traffic destinations (e.g., real-time media delivery such as packet voice and video) do not readily tolerate dropped packets.

What is desirable in this situation is that the traffic from R1 to R4 be rerouted through R3, on a path R1-R2-R3-R4, which on all segments is capable of handling line rate traffic 2lr. This reroute cannot happen, however, as long as L5 and/or L6 are operational, as the route cost for any particular packet from R2 to R4 is lower on a path including L5 and/or L6. The embodiments described below consider LAGs L5 and L6 together, and use one or more methods to effectively bring L5 and L6 down when the two LAGs, considered together, are compromised, even though one or both LAGs are still functional. This allows the routing protocol on R2 to reroute R4 traffic through R3.

In U.S. patent application Ser. No. 11/476,536, "Minimum Links Criteria for Maintaining Peer-to-Peer LACP LAG," filed by S. Mollyn et al. on Jun. 26, 2006, and incorporated herein by reference, methods are described for preventing a link aggregation from coming up, or forcing it down, if the link aggregation does not contain at least a minimum number of members. Because the '536 described method operates within a single LACP instance, it can effectively bring down L6 when L6 drops below a minimum membership, but an otherwise functioning L5 is not affected or considered in the process. When combined with an embodiment of the present disclosure, however, L6 dropping below a minimum membership could affect the state of both L5 and L6 when the LAGs are parallel. As an advantage, present embodiments allow both L5 and L6 to be brought down under circumstances when neither is below its minimum membership but the pair of LAGs, considered together, is below a minimum membership.

For ease of description, the following embodiments will be referred to as Link State Group Dependency (LSGD). Unlike physical layer aggregation or LACP logical aggregation, LSGD does not imply or require an integral capability in an LSGD entity to distribute and collect frames among the group members. Because of this feature, LSGD can operate at a higher level than physical or LACP logical aggregation, with plural links and/or LAGs that are not constrained to use the same hardware or even be on the same line cards.

Figure 1:
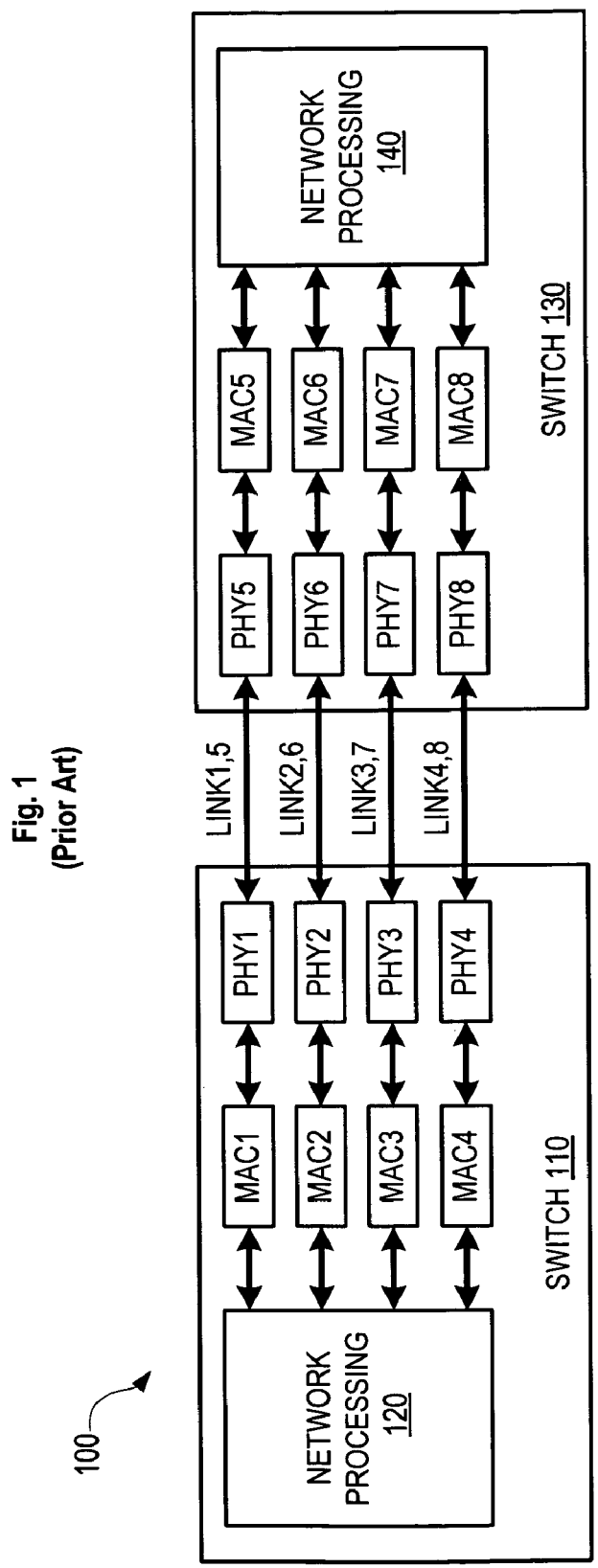
FIG. 1 illustrates a partial network configuration comprising two switches connected by multiple physical links.
Figure 2:
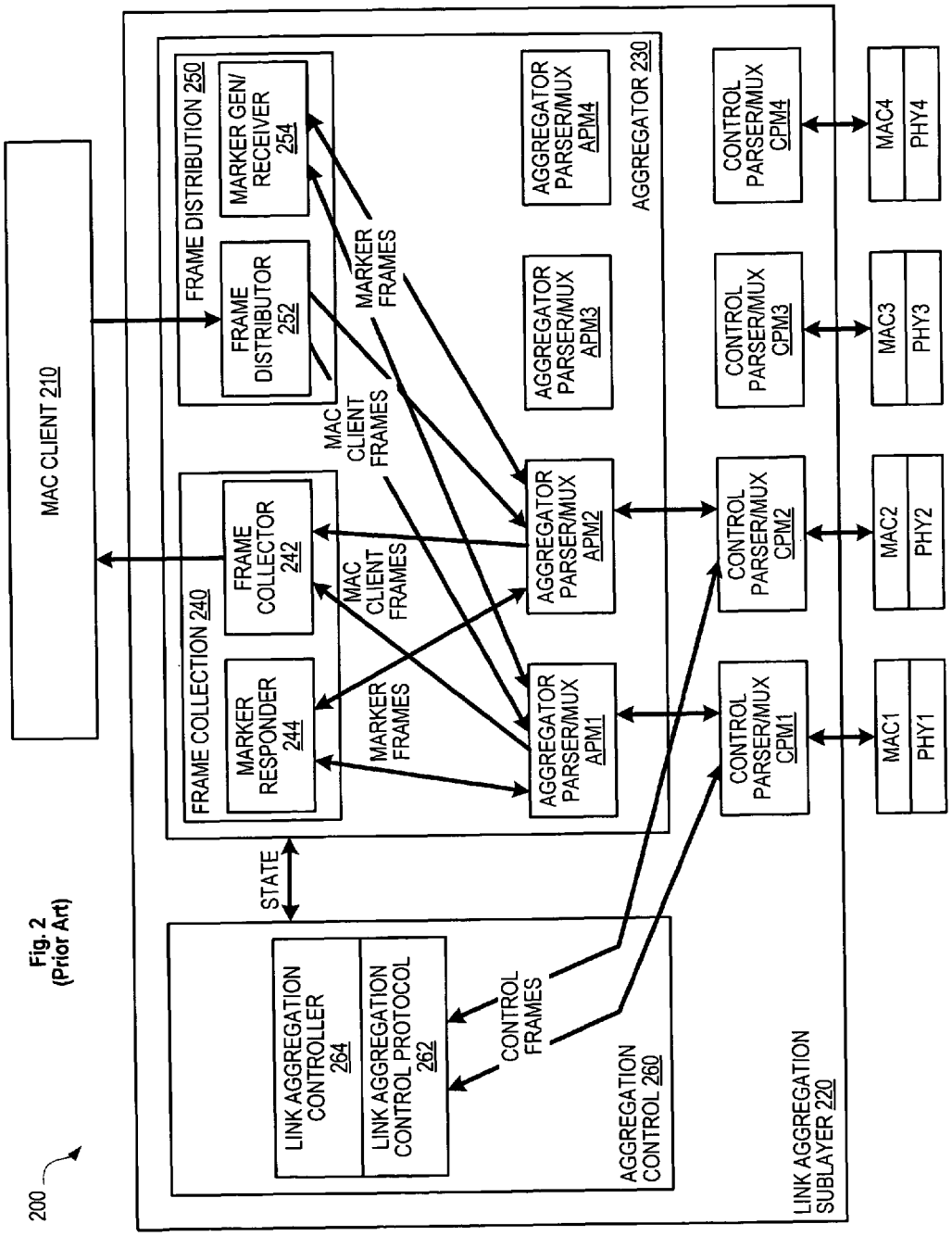
FIG. 2 illustrates an IEEE 802.3 link aggregation sublayer configuration.
Figure 5:
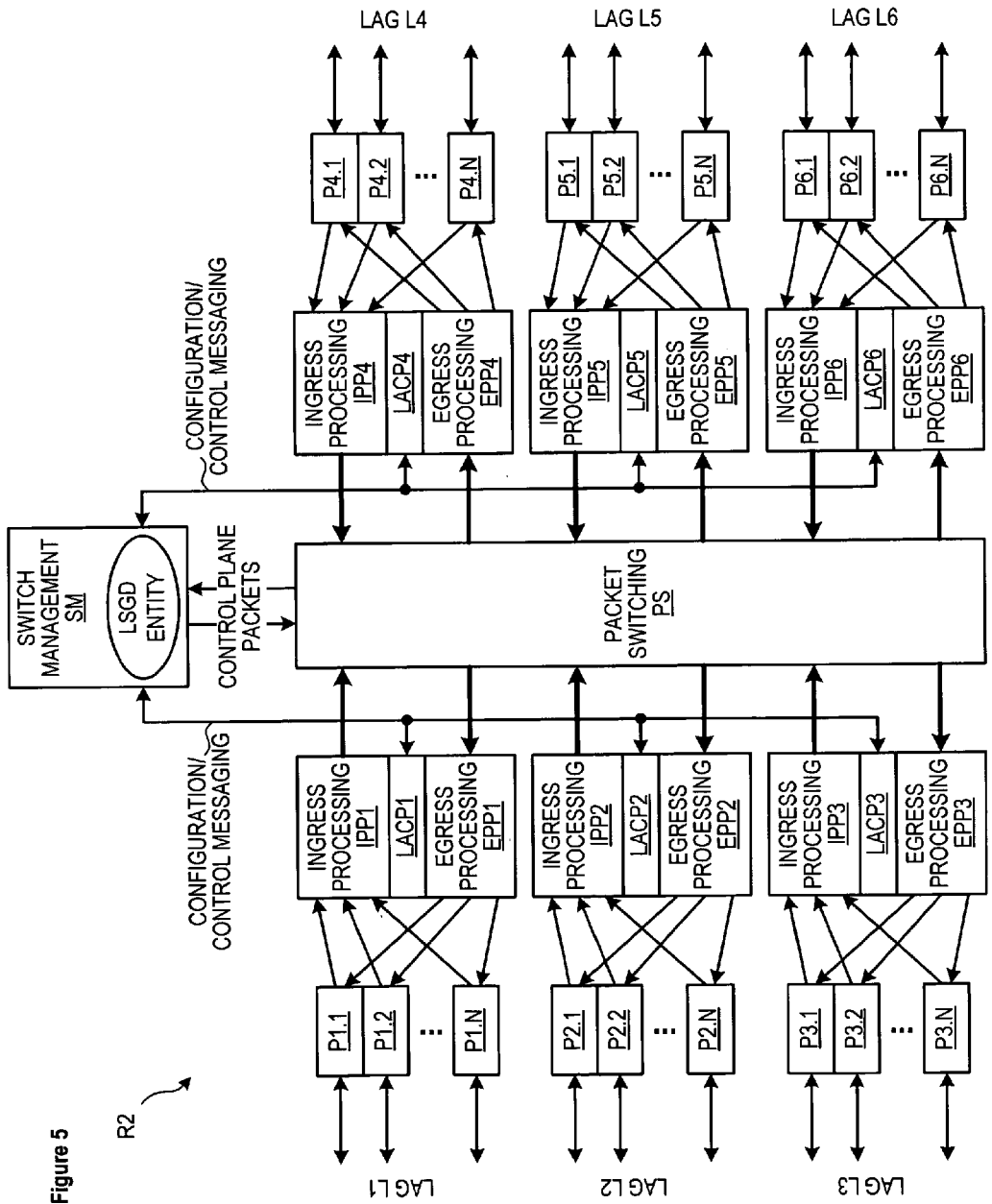
FIG. 5 contains a functional block diagram for a router supporting six LAGs and three groups according to an embodiment.

In one embodiment, link aggregation controllers on a distributed switch/router communicate with a centralized LSGD entity. Referring to FIG. 5, router R2 from FIG. 4 is shown as a collection of communicating functions. Six ports groups, each comprising N individual PHYs and MACs, are depicted respectively as port functions P1.1-P1.N, P2.1-P2.N, P3.1-P3.N, P4.1-P4.N, P5.1-P5.N, and P6.1-P6.N. The members of a port group Pi communicate respectively with a corresponding ingress processing function IPPi, to process and buffer incoming traffic on the port group, and a corresponding egress processing function EPPi, to process and buffer outgoing traffic on the port group. Each ingress processing function IPPi and egress processing function EPPi coordinate with a corresponding Link Aggregation Control Protocol function LACPi that negotiates and administers link aggregation for the group according to the port group configuration. For simplicity, each FIG. 2 LAG group Li, $1 \leq i \leq 6$, is shown associated with all N ports of a port group (which corresponds in turn to a single line card or aggregable portion of a line card in some embodiments). In other configurations, not all ports of a port group need associate with the same LAG, or associate with a LAG at all.

In operation, each IPP/LACP/EPP functional entity communicates with at least two other entities, a packet switching function PS and a switch management function SM. Once an IPP function processes an incoming packet and determines a destination or destinations for that packet, it supplies the packet to packet switching function PS for switching to an appropriate EPP function or functions, or to the switch management function SM when the packet is a non-LACP control packet addressed to the router itself or a control packet multicast address. Switch management runs higher level protocols, such as Spanning Tree Protocol for Layer 2 traffic and OSPF for Layer 3 traffic, and supplies each IPP/LACP/EPP entity with configuration and forwarding information necessary to the processing of traffic on that entity's ports.

In this embodiment, switch management function SM also contains an LSGD entity. Each LACP entity shares information with the central LSGD entity via a configuration/control messaging channel on the router. The shared information includes, e.g., the status of LAGs administered by that LACP entity and number of links active in each such LAG. This information can be refreshed to the LSGD entity whenever a change in the LAG information is logged, as well as optionally at periodic intervals. In turn, the LSGD entity determines whether, based on the status reported by all LAGs in the same LSGD group, whether each LAG should be UP or DOWN, and communicates corresponding instructions to the LACP entities. The LACP entities follow these instructions, in addition to their own internal criteria such as minimum LAG membership, to set the appropriate state for their respectively controlled LAGs.

Figures 6, 7:
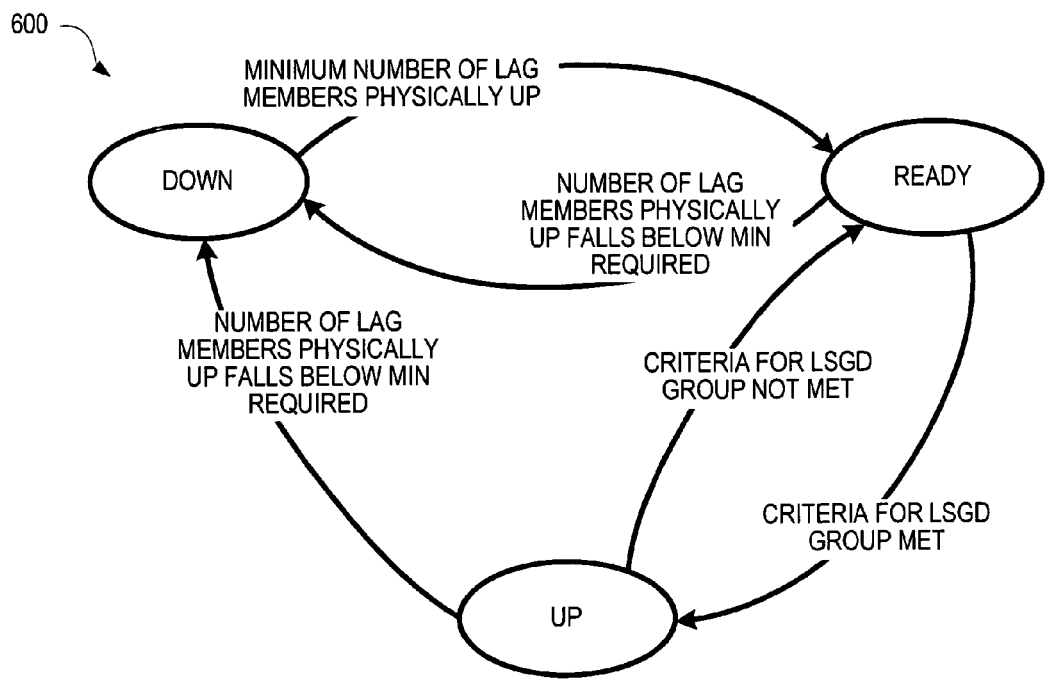
FIG. 6 depicts a state diagram for a LAG that is part of a Link State Group Dependency (LSGD) in an embodiment.
FIG. 7 illustrates a status table maintained by a LSGD entity according to an embodiment.

FIG. 6 contains a state diagram 600 for an individual LAG administered by an LACP entity. Three states are shown— DOWN, READY, and UP. Depending on the current LAG state and LSGD state, the LACP entity controls each LAG member link to achieve that state. In this embodiment, the LACP entity also uses the minimum LAG membership criteria of the '536 patent application in some states, although other embodiments can operate without a minimum LAG membership criteria.

The DOWN state is the initial state of the LAG, as well as the LAG state when the minimum membership criterion is not met. As soon as the set minimum number of LAG member links is physically up, LACP transitions the LAG state to READY, and notifies the LSGD entity that the LAG is READY with whatever members are present. Should the number of members change (up or down) in the READY state, the LACP entity provides updated information to the LSGD entity. When a change drops the number of members below the minimum, LACP transitions the LAG state back to DOWN, and notifies the LSGD entity accordingly.

The LSGD entity processes the LAG status updates for all members of the same LSGD group to determine whether the criteria for that group are met. The criteria can include, for instance, an aggregate number of links that must be READY, group-wide, for the LSGD group to be up, and/or an aggregate bandwidth that must be READY and available, group-wide, for the LSGD group to be up. Assuming that the criteria is met, the LSGD entity communicates an LSGD group status of UP to the LACP entities handling the member LAGs. When the LSGD group status is UP, and a member LAG is in the READY state, the controlling LACP entity transitions the member LAG to the UP state, thereby causing LACP to enable data flow on the LAG.

When the LAG state is UP, two eventualities can cause a state transition. First, should the LSGD entity determine that the LSGD group criteria is no longer met, it will instruct the LACP entity to bring down the functioning member LAG to READY. Second, should the LACP entity determine that the member LAG no longer meets the minimum links criterion, it can take the LAG to the DOWN state and notify the LSGD entity of the transition. The LSGD entity will decide, in turn, whether taking this LAG down should affect the status of the entire LSGD group.

In one embodiment, the LSGD entity maintains a database or table 700, see FIG. 7, that associates each LAG ID on the router with a responsible LACP manager and an LSGD group. Table 700 is populated in FIG. 7 for an example corresponding to R2 of FIG. 2. LAG IDs L1 and L2 associate with an LSGD group G1; LAG IDs L5 and L6 associate with an LSGD group G2; and LAG IDs L3 and L4 associate with a LAG group G3. More than two LAG IDs can associate with the same LSGD group. An LSGD group of 0, as shown in this example associated with a LAG LN, identifies a LAG ID that has no dependency on any other LAG ID. Although the LACP entity for LAG LN is shown reporting status to LSGD, LSGD defaults the group status for LSGD group 0 to "UP," effectively relinquishing control of such LAGs to the individual LACP managers.

The LSGD entity maintains two LAG-specific state parameters in table 700 for each LAG ID. A LAG status parameter takes one of the three states DOWN, READY, and UP shown in FIG. 6, according to the current LAG state reported by the LACP manager. A number-of-LAG-members parameter holds an integer number according to the current number of physically up LAG members reported by the LACP manager. Other LAG-specific parameters, such as minimum number of LAG members, maximum number of LAG members, current bandwidth available, maximum bandwidth available, etc., can also be maintained in addition to/instead of the number of LAG members parameter.

In the table 700 example, each LAG ID is assumed to have a maximum possible membership of four. Thus LAG IDs L1, L2, and L4 have all members physically up; LAG IDs L3 and L5 have 75% of their members (3) physically up; and LAG IDs L6 and LN have 50% of their members (2) physically up. For LSGD groups G1 and G3, the aggregate number of physically up and ready LAG members is 8/8 and 7/8, respectively, which satisfies the group requirements for those LSGD groups. Thus the group status of LSGD groups G1 and G3 is UP. For LSGD group G2, L6 has not met a minimum links criteria of 3, meaning that LAG L6 is DOWN and cannot be counted toward the group status. Accordingly, the aggregate number of physically up and ready LAG members for LSGD group G2 is 3/8, and LSGD maintains the group G3 status as DOWN. Note that the LAG status of L5 is READY, as it is ready to transition to UP should LSGD determine to activate LSGD group G2. Finally, even though LN is reporting only two physically up and ready LAG members and is therefore DOWN based on a minimum links criteria of 3, the group status for group 0 is always UP.

Figure 8:
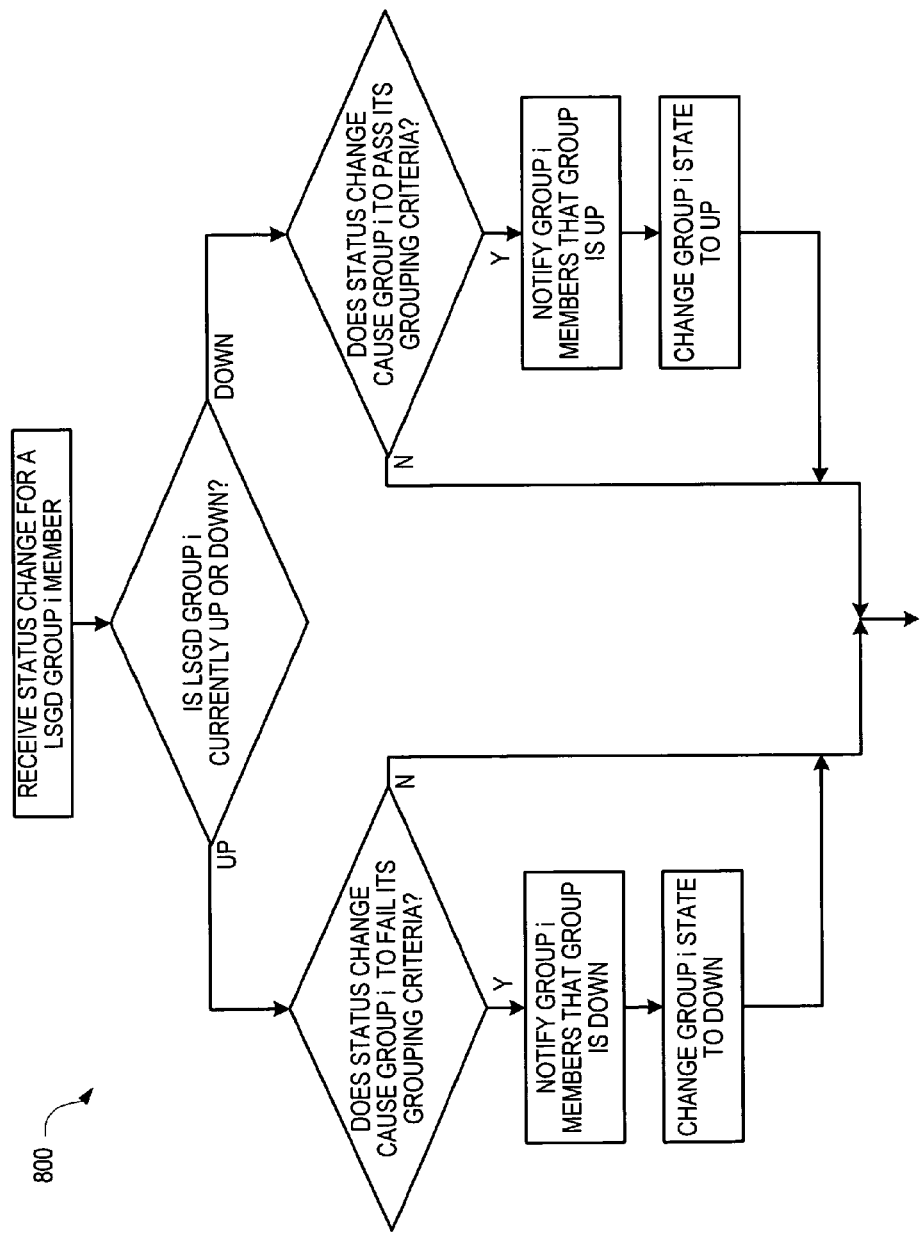
FIG. 8 contains a flowchart for LSGD decision-making.

FIG. 8 contains a flowchart 800 for operation of an exemplary LSGD entity. Calculations by the LSGD entity are event-driven, e.g. by the receipt of a status, change notification from a LACP entity regarding a member of an LSGD group i. The LACP entity need not know the group identity, as the LSGD entity can determine the LSGD group i from the LAG ID and table 700, and update the table 700 entry for the appropriate LAG ID. Once the LSGD entity determines the appropriate group i, the LSGD entity determines the current state of the group, UP or DOWN, and branches accordingly.

When group i is currently UP, the LSGD entity visits the table 700 entries corresponding to the group members, compiling one or more group metrics needed to determine whether the grouping criteria is still met. When the grouping criteria is no longer met, the LSGD entity constructs and sends messages to the LACP entities responsible for the LSGD group i members, notifying each LACP entity to transition the UP members to READY. The LSGD entity changes the group i state to DOWN. Optionally, the LSGD entity can also communicate the status change to other entities, such as an OSPF or IS-IS routing entity.

When group i is currently DOWN, the LSGD entity visits the table 700 entries corresponding to the group members, compiling one or more group metrics needed to determine whether the grouping criteria is now met. When the grouping criteria is now met, the LSGD entity constructs and sends messages to the LACP entities responsible for the LSGD group i members, notifying each LACP entity to transition the READY members to UP. The LSGD entity changes the group i state to UP. Optionally, the LSGD entity can also communicate the status change to other entities, such as an OSPF or IS-IS routing entity.

Figure 9:
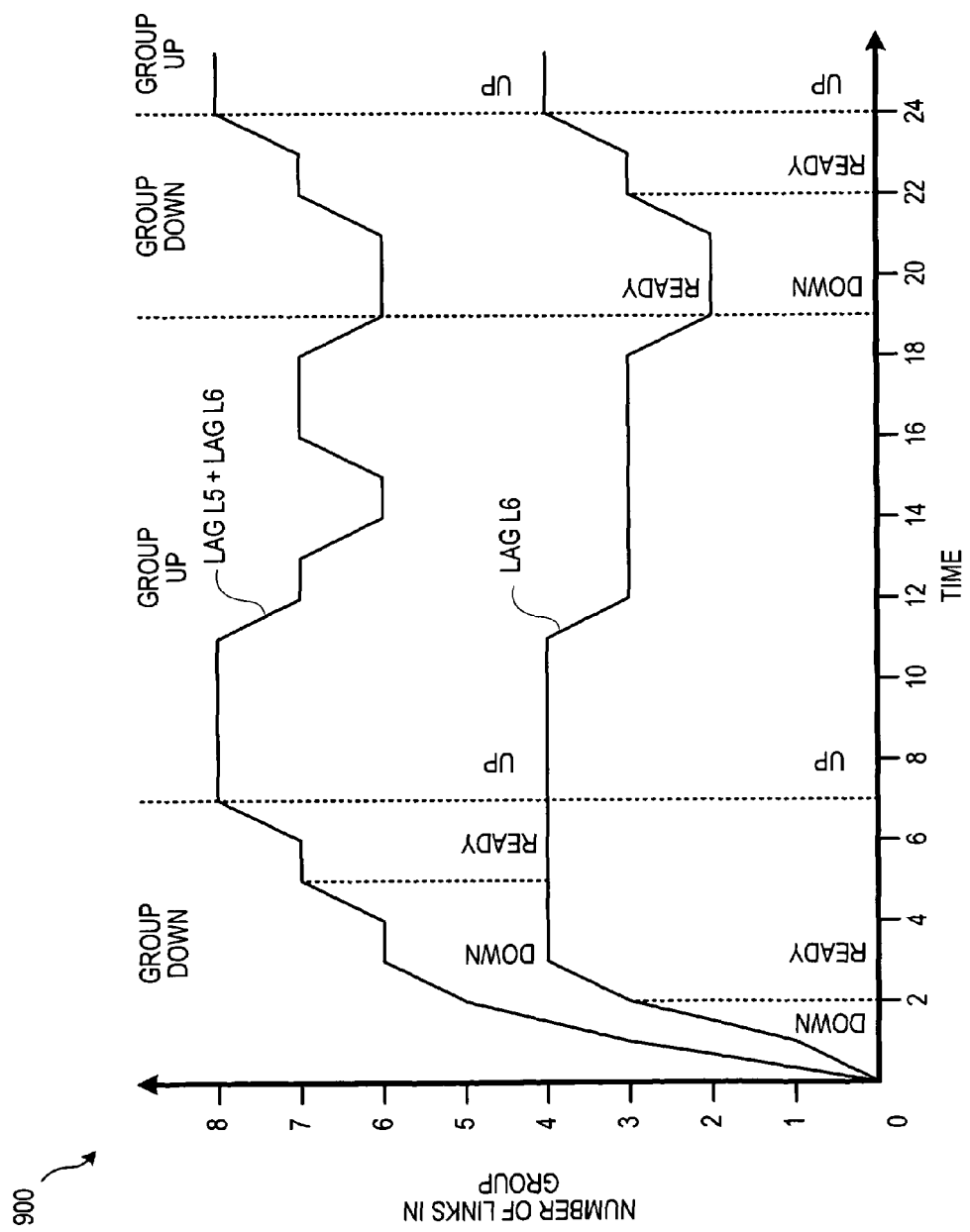
FIG. 9 contains a time graph showing one example for operation of an LSGD group consisting of two LAGs.

FIG. 9 shows an exemplary graph for group G2, with LAG members L5 and L6, showing how group and LAG states transition over time as the number of links up in each LAG varies. The bottom plot graphs the number of links that are physically up and ready for LAG L6, while the top plot graphs the number of links that are physically up and ready for both LAG L5 and LAG L6 (the number of links up for L5 can be obtained by subtracting the bottom line from the top line—the status of L5 is therefore displayed between the two lines).

In this example, each LAG has a maximum membership of four and a minimum of three. The group requires eight up links (both LAGs at full operability) to bring the group UP. Once the group is up, however, criteria of both LAGs READY or UP and at least six up links will maintain the group up, so that minor link instability does not cause the entire group to flap.

At time 0, neither LAG has any ready members, and thus both LAGs are DOWN and the group is DOWN. At time 2, LAG L6 has three ready members, and transitions to READY. At time 3, LAG L6 obtains a fourth ready member. LAG L5 is still DOWN, however, so the group remains DOWN. At time 5, LAG L5 obtains a third member and transitions to READY. Because the group criteria requires all links to be up, however, before the group can be UP, the group remains DOWN and both LAGs hold in a READY state. Finally, at time 7, the fourth link of L5 comes up and the group transitions to UP, followed by both LAGs transitioning to UP.

At time 12, one member of LAG L6 goes down, leaving seven active links across both LAGs. As the group need only maintain both LAGs UP and a total of six active links to remain UP once UP, no status change is caused by this reduction in the number of links.

At time 14, one member of LAG L5 goes down as well, leaving six active links across both LAGs. Like in the previous case, no status change is caused by this reduction in the number of links. Subsequently, at time 16, LAG L5 returns to full capability.

At time 19, a second link on LAG L6 goes down, causing L6 to fail its minimum links criteria and go DOWN. This causes the entire group to go DOWN, and LAG L5 to transition to READY and stop transmitting data traffic.

At time 22, LAG L6 brings up a third link and transitions back to READY. Because the group criteria requires all eight links to be up to bring up the group, however, the group remains down.

Finally, at time 24, LAG L6 brings up its last link again, causing the group to transition to UP and both LAGs to transition to UP.

The preceding example shows one of many possibilities for controlling a group of LAGs based on group dependencies. Hysteresis need not be used, nor does the minimum links criteria need to be used. In another embodiment, the LSGD entity cooperates with an ECMP hashing function, using its knowledge of the current bandwidth available on each LAG as a fraction of the total available bandwidth to instruct the ECMP as to an optimum hash distribution to match the fraction of traffic distributed to each LCMP group member to that member's current relative capacity.

In a given embodiment, the group criteria can include dynamic variables. For instance, when recent traffic peaks for a group are not near the group capacity, the group criteria can be relaxed, and then strengthened should traffic increase. LSGD can also dynamically adjust the minimum membership of a LAG, such that currently tolerable asymmetries between the number of members in parallel LAGs are reflected in the LAG requirements.

The identification of LAGs that should belong to the same LSGD group can be set manually, along with the group policies. Alternately, LAGs that come up and notify the LSGD entity can be initially assigned to LSGD group 0. Should the routing protocol identify one such LAG as parallel with another, LSGD can then automatically group the parallel LAGs and assign a default group policy to the group. Such a policy can also be dynamic, varying flexibly with traffic on the parallel LAGs.

Although a central LSGD entity has been shown in the embodiments, part or all of this entity could be distributed to the processors that administer the LACP entities. These processors can then run parallel copies of the LSGD policies, and share state information directly between themselves, possibly with a central messaging relay entity.

The link aggregation protocol and managers need not be LACP-based, although this approach provides interoperability with peer devices that implement LACP but not necessarily LSGD. In a given implementation, the LSGD members need not be LAGs at all, but can be individual links with a central state management provided by an LSGD implementation. Individual links can also, in an appropriate implementation, exist in the same LSGD group as one or more LAGs, particularly where ECMP hashing can be instructed as to how to asymmetrically load balance traffic between the LSGD group members.

In a given embodiment, the LACP managers can hold a LAG in a READY state in the same manner used in the '536 patent application to prevent a number of links from aggregating until a minimum links criteria is satisfied. For instance, when a LAG would aggregate but for the LSGD state for the LAG being set to DOWN, the ready links of the LAG transmit LACPDUs to their peers with the Actor State (see FIG. 3) Synchronization flag set to no synchronization. When the LSGD state transitions to UP, the LACP managers send LACPDUs on the physically up LAG member ports, indicating that the ports are now synchronized.

Those skilled in the art will appreciate that the embodiments and/or various features of the embodiments can be combined in other ways than those described to implement concepts covered by the present disclosure. It is believed that the described embodiments are readily adaptable to many different system architectures and different peripheral protocols, once the basic operation of the embodiments is understood. A variety of hardware, software, and combination approaches are possible for implementation of an embodiment and various features thereof. No limitation of the broad concepts disclosed herein to a specific approach is suggested or intended by this disclosure.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a packet switch, the method comprising:
    assigning a first link aggregation, comprising a first set of multiple links, to a first link state group dependency group
    assigning a second link aggregation, comprising a second set of multiple links none of which are members of the first set of links, to the first link state group dependency group;
    the first link aggregation is internally managed by a first link aggregation control protocol function in the packet switch and the second link aggregation internally is managed by a second link aggregation control protocol function in the packet switch; and
    a first process local to the first link aggregation control protocol function advertising a state of the first link aggregation to a second process local to the second link aggregation control protocol function, and the second process advertising a state of the second link aggregation to the first process, the first process enabling the links in the first link state group dependency group for data traffic by using the advertisements from the second process during a determination of whether the first link state group meets a first defined link state group dependency criteria.

2. The method of claim 1, further comprising, subsequent to enabling the links in the first link state group dependency group for data traffic, enabling the links in the first link state group dependency group only for control traffic when the first link aggregation is ready to transceive data traffic and the first link state group dependency group fails to meet a second defined link state group dependency criteria.

3. The method of claim 1 or claim 2, wherein the first and second defined link state group dependency criteria are expressed at least in part as a minimum aggregate link availability metric, and wherein the second defined link state group dependency criteria requires a lower minimum aggregate link availability metric for the links in the first link state group dependency group than the minimum aggregate link availability metric required by the first defined link state group dependency criteria.

4. The method of claim 2, further comprising calculating a bandwidth utilization metric for the links in the first link state group dependency group, and dynamically adjusting the second defined link state group dependency criteria based on the bandwidth utilization metric.

5. The method of claim 1, wherein the first defined link state group dependency criteria comprises at least one of a minimum aggregate link availability and a minimum aggregate bandwidth availability.

6. The method of claim 1, wherein enabling the links in the first link state group dependency group comprises a central process receiving a state of the first link aggregation and a state of the second link aggregation, testing the state of the first and second link aggregations against the first defined link state group dependency criteria, and notifying the first and second link aggregation control protocol functions to respectively enable the links in the first and second link aggregations when the first defined link state group dependency criteria is met.

7. The method of claim 6, wherein the first and second link aggregations are manually assigned to the first link state group.

8. The method of claim 6, further comprising the central process automatically assigning the first and second link aggregations to the first link state group dependency group.

9. The method of claim 8, wherein automatically assigning the first and second link aggregations to the first link state group dependency group comprises each link aggregation control protocol function in the packet switch reporting a state of the link aggregations that the link aggregation control protocol function manages to the central process, the central process discovering that the first and second link aggregations are parallel, and consequently assigning the first and second link aggregations to the first link state group dependency group.

10. The method of claim 9, the central process assigning link aggregations that have not been assigned to a link state group dependency group with a central link state group dependency criteria to a default group that has no centralized criteria controlling the state of the link aggregations.

11. The method of claim 6, the central process communicating changes in the status of the first link state group dependency group to a routing protocol process running in the packet switch.

12. The method of claim 6, the central process cooperating with a hash function manager to instruct the hash function manager how to balance traffic across the member link aggregations of the first link state group dependency group.

13. The method of claim 1, wherein the first and second protocol managers respectively manage links in the first and second link aggregations at either the physical layer or the link layer.

14. An apparatus comprising a computer memory containing computer instructions that, when executed by a packet switch comprising one or more processors, cause the packet switch to perform a method comprising:
assigning a first link aggregation, comprising a first set of multiple links, to a first link state group dependency group;
assigning a second link aggregation, comprising a second set of multiple links none of which are members of the first set of links, to the first link state group dependency group;
wherein the first link aggregation is internally managed by a first link aggregation control protocol function in the packet switch and the second link aggregation is internally managed by a second link aggregation control protocol function in the packet switch: and
wherein a first process local to the first link aggregation control protocol function advertises a state of the first link aggregation to a second process local to the second link aggregation control protocol function, and the second process advertises a state of the second link aggregation to the first process, the first process enabling the links in the first link state group dependency group for data traffic by using the advertisements from the second process during a determination of whether the first link state group meets a first defined link state group dependency criteria.

* * * * *